US005704218A

United States Patent [19]
Christians et al.

[11] Patent Number: 5,704,218
[45] Date of Patent: Jan. 6, 1998

[54] INTEGRATED ENVIRONMENTAL CONTROL SYSTEM

[75] Inventors: Douglas L. Christians, Vernon; Diane G. Drew, Suffield, both of Conn.; Mark L. Harris, Agawam, Mass.; Erin G. Kline, Vernon; Michael Zager, Windsor, both of Conn.

[73] Assignee: United Technologies Corporation, Hartford, Conn.

[21] Appl. No.: 629,984

[22] Filed: Apr. 8, 1996

[51] Int. Cl.$^6$ ....................................... F25D 9/00
[52] U.S. Cl. ............................... 62/172; 62/402
[58] Field of Search ...................... 62/87, 172, 401, 62/402, 510; 454/71

[56] References Cited

U.S. PATENT DOCUMENTS

| | | |
|---|---|---|
| 2,940,280 | 6/1960 | Reaser . |
| 3,386,262 | 6/1968 | Hackbart et al. . |
| 3,877,246 | 4/1975 | Schutze . |
| 4,021,215 | 5/1977 | Rosenbush et al. . |
| 4,209,993 | 7/1980 | Rannenberg . |
| 4,262,495 | 4/1981 | Gupta et al. . |
| 4,374,469 | 2/1983 | Rannenberg . |
| 4,430,867 | 2/1984 | Warner . |
| 4,445,342 | 5/1984 | Warner . |
| 4,646,530 | 3/1987 | Huenniger . |
| 5,142,883 | 9/1992 | DeWitt . |
| 5,231,846 | 8/1993 | Goshaw et al. . |
| 5,461,882 | 10/1995 | Zywiak . |

FOREIGN PATENT DOCUMENTS

| | | |
|---|---|---|
| 108357 | 9/1967 | United Kingdom . |

OTHER PUBLICATIONS

Aircraft Engineering, vol. 45, No. 4, Apr. 1973, R. Sherbourne, "A Fourth Air Conditioning Group".

Aircraft Engineering, vol. 46, No. 6, Jun. 1974, "Air Conditioning Pressurization and APU".

Proceedings of the Institution of Mechanical Engineers, a Automobile Division, vol. 179, No. Pt. 1, 1964, p. 1050 London GB, D.R. Newman, "Aerodynamic and Performance Demands".

Primary Examiner—Henry A. Bennett
Assistant Examiner—Susanne C. Tinker
Attorney, Agent, or Firm—Malcolm J. Chisholm, Jr.

[57] ABSTRACT

An integrated environmental control system is disclosed for providing conditioned supply air to loads such as a passenger cabin of an aircraft. The system comprises at least two shafts, each shaft having a fan, compressor, and turbine mechanically secured to the shaft; common heat transfer components including primary and secondary heat exchangers, a reheater, and a condenser with a water collector; lines that deliver the supply air separately through the compressors and turbines of each shaft and deliver the supply air in common through the common heat transfer components to the load; and shutoff valves secured in fluid communication with each turbine. Upon interruption in the flow of cooled supply air out of a particular turbine secured to any of the shafts, a shutoff valve shuts off transfer of the supply air to that particular turbine on that interrupted shaft and the remaining shafts and their respective fans, compressors, turbines, and the common heat transfer components continue to receive, condition and deliver the supply air to the load in a redundant operating mode. Because the total heat exchange capacity of the integrated, common heat transfer components is large enough to satisfy conditioned air requirements of the load, and in the redundant operating mode the supply air is exposed to that total heat exchange capacity, the system provides enhanced redundant operating mode performance and offers decreased weight, size, and cost over known systems having mechanical components of a comparable size, weight and work capacity.

18 Claims, 2 Drawing Sheets

INTEGRATED ENVIRONMENTAL CONTROL SYSTEM

TECHNICAL FIELD

The present invention relates to environmental control systems for providing conditioned air to loads such as aircraft cabins, and especially relates to environmental control systems utilizing turbine driven air cycle machines to provide pressurized, dehumidified, cooling air.

BACKGROUND OF THE INVENTION

Pressurized environments such as aircraft passenger cabins are maintained at a desired air pressure, temperature and humidity by a constant supply of conditioned air. Typically the conditioned air is supplied to the cabin or load by an environmental control system having an air cycle machine that has a combination of mechanical components and heat transfer components. For example, a common air cycle machine has mechanical components consisting of typically a fan, compressor and turbine, wherein the moving parts of the fan, compressor and turbine are mechanically connected together by a single shaft, in a well known manner. The heat transfer components of such an environmental control system typically consist of a primary and secondary heat exchanger, a reheater and a condenser with a water collector. Fluid transfer lines and ducts pass supply air to be conditioned and a heat transfer fluid through the mechanical and heat transfer components of the environmental control system to supply the conditioned air to the load.

In an aircraft operating environment utilizing such an air cycle machine in the aircraft's environmental control system to provide conditioned air to the aircraft cabin, flight deck, etc., supply air such as compressed, heated bleed air is typically directed or bled from a compressor stage of a gas turbine engine on the aircraft into the air cycle machine to be conditioned. The bleed or supply air is first passed in heat exchange relationship within a primary heat exchanger with a cooling fluid such as ram or ambient air. Next the supply air is compressed in the air cycle machine's compressor; passed again in heat exchange relationship with the cooling fluid within a secondary heat exchanger; and directed into the machine's turbine. Work done on the turbine by the compressed supply air causes a shaft mechanically secured to the turbine to rotate, and the shaft aids in driving a rotor of the compressor and in spinning the fan which is typically positioned within the flow of the cooling fluid or ram air. Ultimately the supply air having been expanded and hence cooled within the turbine is discharged to the load, in a manner well known in the art.

Many improvements on the basic operation of air cycle machine driven environmental control systems have been developed to increase their efficiency, and decrease operating penalties on the aircraft. For example, recirculated load or cabin air has been injected downstream of the turbine discharge to augment turbine discharge air, thereby enabling delivery of higher conditioned air flow rate. Additionally, reheaters and condensers with water collectors have been positioned in heat exchange relationship with the supply air to enhance removal of moisture from the supply air, while decreasing the proportion of moisture entering the turbine. These and many other improvements are disclosed in U.S. Pat. Nos. 4,209,993 and 4,374,469 to Rannenberg; 4,430,867 and 4,445,342 to Warner; and 5,461,882 to Zywiak, all of which are hereby incorporated herein by reference and all of which are assigned to the same assignee as that of the integrated environmental control system invention described herein.

In the working environment of an aircraft, two design parameters dictate the work capacity of components of an environmental control system. Those two design parameters are first the volume and pressure requirements of the load, and second, system redundancy requirements. Because maintaining proper pressurization of the load (e.g., passenger cabin, flight deck, etc.), is critical for safe operation of the aircraft, modern environmental control systems are designed to include a redundancy capacity in the event of failure of components of the environmental control system. The most common redundancy structure is to have two or more air cycle machines working in parallel, wherein the conditioned air output of each machine is directed to a mixer unit prior to entering the load. A common system uses two air cycle machines and is referred to in the art as a "Two Pack ECS".

In the event a compressor, turbine, etc. of one air cycle machine fails, that machine, or pack, is automatically shut down, and the surviving pack operates in a redundant operating mode to provide conditioned air to the load at a degraded performance level. The minimum or degraded performance requirements of the load for conditioned air therefore become design limitations for each of the air cycle machines of such a Two Pack ECS. In other words, each air cycle machine must have an operating capacity that can sustain the degraded performance requirements of a specific aircraft's load. While the degraded performance of such an environmental control system is capable of allowing the aircraft to continue to its planned destination with no interruption, repair or replacement of the environmental control system is often mandated prior to a subsequent flight.

Consequently, optimum dispatchability of the aircraft is hindered by known environmental control systems. Moreover, because of structural limitations, known environmental control systems necessarily involve high volume, high weight, and high manufacturing cost to satisfy system redundancy requirements.

Accordingly, it is the general object of the present invention to provide an integrated environmental control system that overcomes the volume, weight, cost and dispatchability problems of the prior art.

It is a more specific object to provide an integrated environmental control system that enhances degraded system operating capacity during a redundant operating mode.

It is another specific object to provide an integrated environmental control system that decreases total amount of fluid transfer lines, ducts and related valves, thereby reducing a total number of potential points of system failure.

It is yet another specific object to provide an integrated environmental control system that is more economical to produce, is capable of enhanced performance during a redundant operating mode, and is safer to operate than known systems.

These and other objects and advantages of this invention will become more readily apparent when the following description is read in conjunction with the accompanying drawings.

DISCLOSURE OF THE INVENTION

An integrated environmental control system is disclosed for providing conditioned air to loads such as a passenger cabin of an aircraft. The integrated environmental control system comprises at least two shafts, each shaft having a fan, compressor, and turbine mechanically secured to the shaft; common heat transfer components including primary and secondary heat exchangers, a reheater, and a condenser with a water collector; fluid transfer lines that direct a supply air through the separate fans, compressors, turbines and common heat transfer components to the load; and shutoff valves secured in fluid communication with each turbine, so that upon interruption in the flow of cooled supply air out of a particular turbine secured to any of the shafts, a shutoff valve shuts off transfer of the supply air to that particular turbine on that interrupted shaft and the remaining shafts and their respective fans, compressors, turbines, and the common heat transfer surfaces continue to receive, condition and deliver the supply air to the load.

In a particular embodiment, the integrated environmental control system has a first shaft having mechanically secured thereto a first fan, first compressor and first turbine; and a second shaft having mechanically secured thereto a second fan, second compressor and second turbine. A supply air, such as compressed, heated bleed air from a compressor stage of the aircraft's gas turbine engines is directed through a common primary heat exchanger in heat exchange relationship with a cooling fluid such as ram or ambient air. The ram air is also in fluid communication with the first and second fans. Next the supply air is directed through separate fluid lines to the first and second compressors to be compressed, and then back in common fluid lines to a common secondary heat exchanger in heat exchange relationship with the cooling fluid. The compressed supply air is directed in common fluid lines through a common reheater, and common condenser with a water collector, back through the common reheater, and next directed through separate lines into the first and second turbines to be cooled upon decompression and to do work in the turbine causing the turbines to rotate their respective shafts and moving parts of the compressor and fan secured to each shaft. The cooled supply air then leaves the first and second turbines to be mixed together and become a secondary cooling fluid within the condenser before finally being directed into the load or passenger cabin as conditioned air.

First and second shutoff valves are positioned on first and second turbine feed lines between the common reheater and first and second turbine, so that upon failure of any of the non-common components, such as any of the components mechanically secured to either the first or second shaft, the first or second shutoff valve will shut off further transfer of the supply air into the turbine on that failed shaft, thereby stopping further conditioning of the supply air by the mechanical components of the failed shaft. The integrated environmental control system then continues to operate in such a redundant operating mode as the supply air continues to pass through and be conditioned by the compressor and turbine of the non-failed, or surviving shaft, and the common primary and secondary heat exchangers, common reheater, and common condenser.

The heat exchange capacity of the integrated environmental control system's heat transfer components must be sufficiently large to satisfy specific conditioned air requirements of the load for which the system is designed. Therefore, when the integrated environmental control system is operating in the redundant operating mode, the supply air is exposed to the total heat exchange capacity of the common primary and secondary heat exchangers, common reheater, and common condenser. Consequently, the integrated environmental control system of the present invention offers enhanced performance in the redundant operating mode compared to common "Two Pack ECS" systems, or compared to any multi-shaft, parallel systems having fans, compressors, turbines of the same size or operating capacity as those of the present invention. By integrating heat transfer components, the present invention necessarily has a greater proportion of heat exchange surface areas available during the redundant operating mode than known environmental control systems. Accordingly, compared to the prior art, the integrated environmental control system of the present invention offers increased operating performance, decreased weight, size (or installation envelope), and cost, while also providing a decreased total number of components, fluid transfer lines and related valves, thereby decreasing the total number of potential points of system failure, thereby increasing system reliability.

BEST MODE FOR CARRYING OUT THE INVENTION

Figure 1:
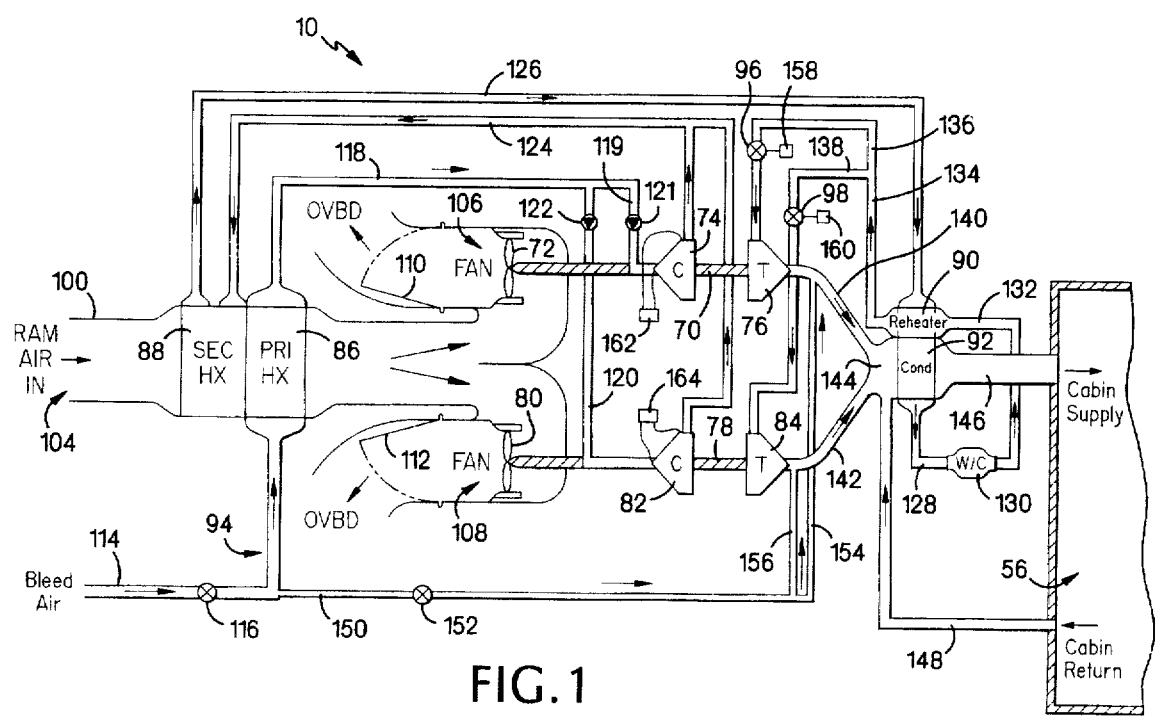
FIG. 1 is a schematic representation of an integrated environmental control system of the present invention.
Figure 2:
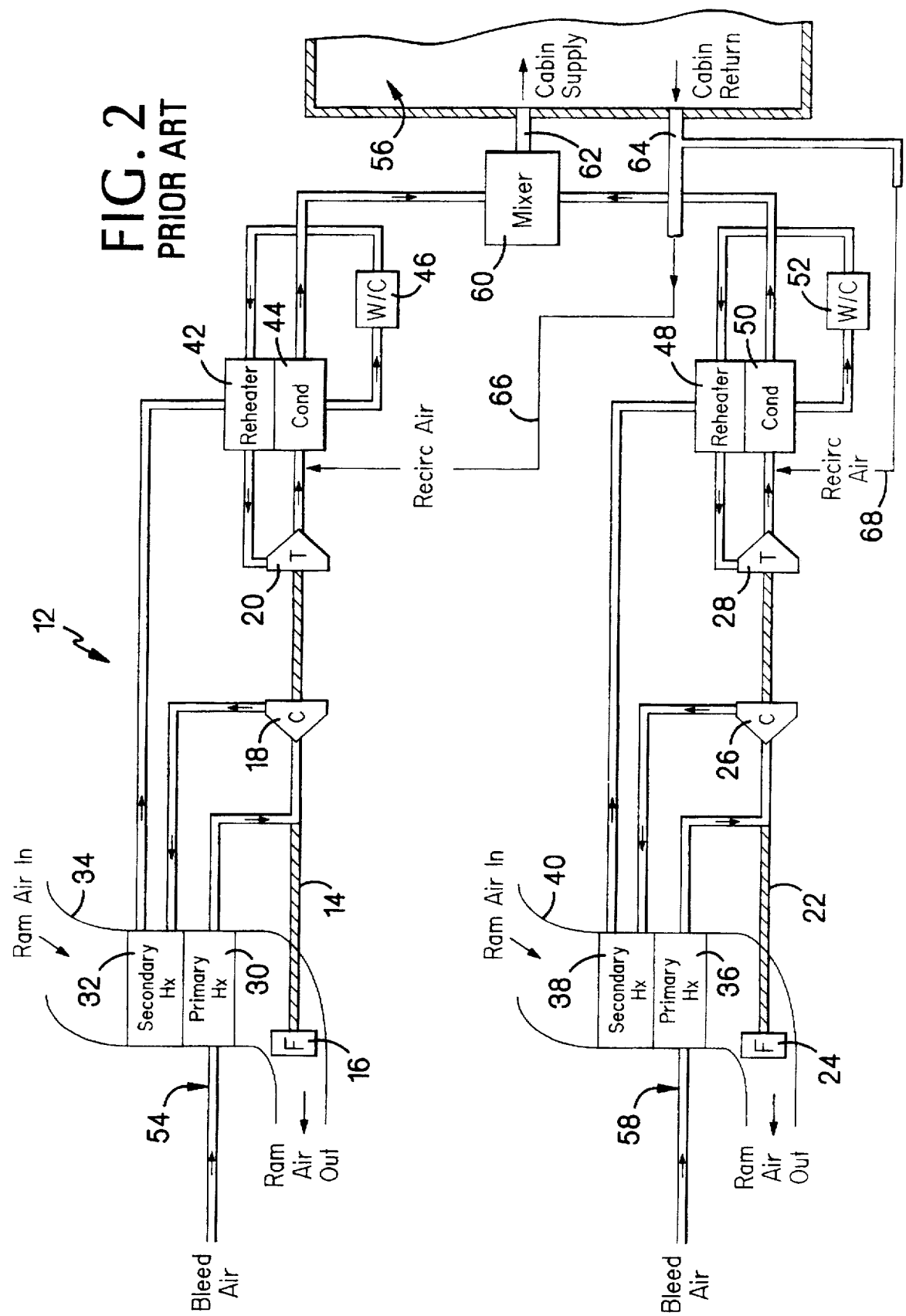
FIG. 2 is a simplified schematic representation of a prior art environmental control system.

Referring to the drawings in detail, an integrated environmental control system of the present invention is shown in FIG. 1, and generally designated by the reference numeral 10. A prior art environmental control system generally characterized in the art as a "Two Pack ECS" is shown in a simplified schematic representation in FIG. 2, and is designated by the reference numeral 12. The Two Pack ECS 12 includes an A-side shaft 14 to which are mechanically secured an A-side fan 16, A-side compressor 18, and A-side turbine 20, a B-side shaft 22 to which are mechanically secured a B-side fan 24, B-side compressor 26, B-side turbine 28. An A-side primary heat exchanger 30 and an A-side secondary heat exchanger 32 are secured within an A-side ram air duct 34 that directs ram or ambient air as a cooling fluid through the duct 34, which is also in fluid communication with the A-side fan 16. A B-side primary heat exchanger 36 and a B-side secondary heat exchanger 38 are secured within a B-side ram air duct 40 that directs ram or ambient air as a cooling fluid through the duct 40, which is also in fluid communication with the B-side fan 24. An A-side reheater 42 and A-side condenser 44 are in fluid communication with an A-side water collector 46, while similarly a B-side reheater 48 and B-side condenser 50 are in fluid communication with a B-side water collector 52.

An A-side supply fluid line 54 directs a supply air, such as bleed air from compressor stages of a gas turbine engine (not shown), sequentially through the A-side primary heat exchanger 30, compressor 18, secondary heat exchanger 32, reheater 42, condenser 44, and water collector 46 and turbine 20 so that the supply air is conditioned to satisfy air pressure, temperature and humidity requirements of an aircraft cabin or load 56. A B-side supply fluid line 58 similarly directs the supply air sequentially through the B-side primary heat exchanger 36, compressor 26, secondary heat exchanger 38, reheater 48, condenser 50, and water collector 52 and turbine 28. The A-side fluid line directs the conditioned air from the A-side turbine 20 through the A-side condenser and into a mixer 60 where the conditioned air from the A-side turbine 20 is mixed with conditioned air directed from the B-side turbine 28 through the B-side supply fluid line 58. The mixed, conditioned supply air is directed from the mixer 60 through a joint cabin induction line 62 out of the Two Pack ECS 12 and into the aircraft cabin 56. After an exposure period within the cabin 56, a cabin return line 64 directs a portion of the cabin air back to the Two Pack ECS 12 by way of an A-side recirculation line 66 and a B-side recirculation line 68 separately into the A-side supply fluid line 54 and B-side supply fluid line 58 at points on those fluid lines 54, 58 immediately downstream of the A-side turbine 20 and B-side turbine 28 to melt any accumulated ice therein, in a manner well known in the art.

In the event any of the "A-side" components listed above fail so that the output of conditioned supply air from the A-side supply fluid line is interrupted, the output of conditioned supply air from the "B-side" components must be adequate to satisfy degraded requirements of the aircraft passenger cabin or load 56. Those degraded requirements would permit the aircraft to continue its flight to a planned destination as the "B-side", or non-interrupted side components perform in a redundant operating mode. As is apparent, when the prior art Two Pack ECS 12 is operating in such a redundant operating mode it only has available at most one-half of the total heat exchange surface areas of its many heat transfer components, those components including the A-side and B-side primary and secondary heat exchangers 30, 32, 36, 38 and the A-side and B-side reheaters and condensers 42, 44, 48, 50.

As best seen in FIG. 1, a preferred embodiment of the integrated environmental control system 10 of the present invention includes a first shaft means for mechanically compressing and cooling a supply air such as first shaft 70 having mechanically secured thereto as mechanical components a first fan 72, a first compressor 74, and a first turbine 76; a second shaft means for mechanically compressing and cooling a supply air, such as second shaft 78 having mechanically secured thereto as mechanical components a second fan 80, a second compressor 82, and a second turbine 84; common heat transfer component means for cooling and controlling the humidity of a supply air through heat exchange relationship with a cooling fluid such as a common primary heat exchanger 86, a common secondary heat exchanger 88, a common reheater 90, and a common condenser 92; a supply fluid delivery means for delivering a supply air separately into mechanical components of the first shaft means and the second shaft means and for delivering the supply air in common through the common heat transfer component means to a load that receives the conditioned air, such as supply fluid line 94; and shutoff valve means for selectively shutting off delivery of the supply air to either the first turbine 76 or second turbine 84 in the event of any interruption in flow of cooled supply air flowing out of either the first turbine 76 or second turbine 84, such as first shutoff valve 96 and second shutoff valve 98, so that the supply air continues to be conditioned by mechanical components of the non-interrupted or surviving shaft means and by heat transfer components of the common heat transfer component means.

The integrated environmental control system 10 also includes a ram air duct 100 housing the common primary and secondary heat exchangers 86, 88. A receiving end 104 of the ram air duct 100 receives ram air as a cooling fluid from a source (not shown) outside of the integrated environmental control system 10, such as ambient air outside of an aircraft housing the system 10. A first fan housing 106 of the ram air duct 100 receives the ram air downstream of the common primary and secondary heat exchangers 86, 88 and is structured to house the first fan 72 so that rotation of the first fan 72 by the first shaft assists movement of the ram air through the ram air duct 100. Similarly, a second fan housing 108 houses the second fan 80 downstream of the common primary and secondary heat exchangers 86, 88 so that rotation of the second fan 80 assists movement of the ram air through the ram air duct 100. A first ram discharge check valve 110 is positioned downstream of the first fan 72 within the first fan housing 106 so that no fluids or foreign objects are drawn into the first fan housing 106 in the event the first fan 72 is not spinning while the second fan 80 is operating. A second ram discharge check valve 112 is positioned downstream of the second fan within the second fan housing 108 so that no fluids or foreign objects are drawn into the second fan housing 108 in the event the second fan 80 is not spinning while the first fan 72 is operating. The first and second fan housings 106, 108 are structured to permit discharge of the ram air passing through the ram air duct 100 out of the integrated environmental control system 10, or "overboard" of an aircraft housing the system 10, as indicated by the common abbreviations "OVBD" shown in FIG. 1.

The supply fluid line 94 includes a supply inlet 114 that receives and introduces a supply air such as "Bleed Air" (as shown in FIG. 1) into the integrated environmental control system 10. Typically the supply air is hot, compressed bleed air directed from the compressor stages or a gas turbine engine (not shown) or an auxiliary power unit (not shown) in a manner well known in the art. A main supply valve 116 regulates flow of the supply air beyond the supply inlet 114 and into a common primary heat exchanger line 118, which directs the supply air into, through, and out of the common primary heat exchanger 86 where the supply air passes in heat exchange relationship with the ram cooling air. Next, the supply air is split into a first compressor line 119 that directs a portion of the supply air into, through and out of the first compressor 74, and into a second compressor line 120 that directs a remaining portion of the supply air into, through and out of the second compressor 82, where the supply air is compressed by the first and second compressors 74, 82 to a desired pressure in a manner well known in the art. First compressor line 119 includes a first compressor check valve 121, and second compressor line 120 includes a second compressor check valve 122 that prevent reverse flow of any supply air through the first or second compressor 74, 82 when normal supply air flow through either compressor is interrupted, such as when the first or second shut off valves 96, 98 have shut off flow of the supply air to either the first or second turbine 76, 84.

After being compressed, the supply air flows out of the first and second compressor lines 119, 120 into a common secondary heat exchanger line 124 that directs the supply air into the common secondary heat exchanger 88, where the supply air again passes in heat exchange relationship with the ram air. The supply air next leaves the common secondary heat exchanger 88 in a reheater feed line 126 that directs the supply air into and through the common reheater 90 and common condenser 92, and into a water collector feed line 128 that directs the supply air into a water collector 130 (designated "W/C" for convenience in FIG. 1). In the common condenser 92 the supply air passes in heat exchange relationship with cooled supply air discharged from the first and second turbines 76, 84 which causes a drop in temperature of the supply air within the common condenser 92, thereby condensing moisture within the supply air. The condensed moisture is removed from the supply air in the water collector 130 in a manner well known in the art. Next a secondary reheater injection line 132 directs the supply air back into and through the common reheater 90 wherein the supply air passes as a secondary cooling fluid in heat exchange relationship with the supply air passing through the common reheater 90 within the reheater feed line 126. The supply air within that reheater feed line 126 has not been cooled within the common condenser 92, so it is at a higher temperature than the supply air within the secondary reheater injection line 132. Consequently, the supply fluid in that secondary reheater injection line 132 absorbs some of the heat from the supply air in the reheater feed line 126, which causes any entrained moisture in a vapor form within the supply air to change to a gas phase prior to entering the first or second turbines 76, 84, thereby minimizing moisture damage to the turbines.

The supply air then moves out of the secondary reheater injection line 132 into a reheater discharge line 134 where the supply air is again split so that a portion flows into a first turbine feed line 136 that directs that portion into the first turbine 76, while the remaining portion of supply air passes into a second turbine feed line 138 that directs that remaining portion into the second turbine 84. Within the first and second turbines 76, 84 the separate portions of supply air are decompressed and hence cooled, and simultaneously perform work on the turbines 76, 84 causing the first turbine 76 to rotate the first shaft 70 and the second turbine 84 to rotate the second shaft 78 in a manner well known in the art. The portion of supply air within the first turbine 76 passes out of the first turbine within a first turbine discharge line 140 and the remaining portion of the supply air within the second turbine 84 passes out of the second turbine within a second turbine discharge line 142.

The first and second turbine discharge lines 140, 142 direct the separate portions of supply air to mix together again within a common condenser housing 144, where the supply air serves as a tertiary cooling fluid for that portion of the supply air in the reheater feed line 126 that is within the common condenser 92. The cooled supply air then passes out of the common condenser housing 144 and into a common cabin induction line 146 that directs the then conditioned supply air into the aircraft cabin 56 (as designated by the phrase "Cabin Supply" in FIG. 1).

A cabin recirculation line 148 directs supply air that has been in the aircraft cabin 56 for a duration of time, in a well known manner (as designated by the phrase "Cabin Return" in FIG. 1), from the cabin 56 to the common condenser housing 144, in order to reduce some of the total load requirements on the integrated environmental control system 10, depending upon the varying aircraft pressure requirements and ram air conditions, which are a function of the aircraft's particular operating environment. For example while boarding passengers or at low altitudes the cabin pressurization requirements and ram air temperatures differ markedly from the pressurization requirements and ram air temperatures while at a cruise altitude of modern aircraft. As is well known in the art, varying recirculation of cabin air into the supply air delivered by an environmental control system assists in lowering total ram air requirements, etc.

A system bypass line 150 is in fluid communication with the supply fluid line 94 between the main supply valve 116 and the common primary heat exchanger 86. The system bypass line 150 directs a bypass portion of the supply air through a bypass control valve 152 and then into a first turbine bypass line 154 and a separate second turbine bypass line 156. The first turbine bypass line 154 directs some of the bypass portion of the supply air into the first turbine discharge line 140, while the second turbine bypass line 156 directs the remainder of the bypass portion of the supply air into the second turbine discharge line 142. By regulation of the bypass control valve 152 in a manner well known in the art, variable amounts of the pressurized, heated bleed air that serves as the supply air may be injected directly downstream of the first and second turbines 76, 84 to both melt any accumulated ice and also to regulate the temperature of the supply air leaving the turbines 76, 84.

The shutoff valve means for selectively shutting off delivery of supply air to either the first turbine 76 or the second turbine 84 includes detecting means for detecting any interruption in the flow of cooled supply air flowing out of either the first or second turbines 76, 84. The detecting means is in electrical communication with both a first shut off valve actuator 158 that controls the first shut off valve 96 and a second shut off valve actuator 160 that controls the second shut off valve 98, and could comprise any of a variety of known detecting mechanisms commonly used to monitor and isolate a failed portion of an environmental control system, such as a first compressor temperature monitor 162 that monitors temperature changes of the supply air entering and leaving the first compressor 74 and a second compressor temperature monitor 164 that monitors temperature changes of the supply air entering and leaving the second compressor 82.

In operation of the integrated environmental control system 10 of the present invention, because the mechanical components (the first and second fan 72, 80, the first and second compressor 74, 82, and the first and second turbine 76, 84) are mechanically secured to their respective first or second shaft (meaning that rotation of the shaft rotates moving parts of the mechanical components secured to the shaft), failure of any one of the mechanical components secured to either the first or second shaft 70, 78 will necessarily effect mechanical performance of the compressor secured to the shaft. For example, if the first turbine 76 starts to rotate below its desired level due to an ordinary bearing deterioration within the turbine or for any reason, the first shaft 70 will also slow its rotation which in turn causes a slowing of the performance of the first compressor 74, which will effect the temperatures of the supply air leaving the first compressor 74. The first compressor temperature monitor 162 of the detecting means will sense the change from a desired temperature for the first compressor 74, and will automatically actuate the first shut off valve actuator 158 to shut off the first shut off valve 96, thereby causing the supply air to stop performing work on the first turbine 76 resulting in cessation of rotation of the first shaft 70. In such a circumstance, the integrated environmental control system 10 continues to supply conditioned air to the aircraft cabin 56 in a redundant operating mode, wherein the supply air continues to be conditioned by both the mechanical components of the non-interrupted or surviving second shaft means (including the second fan 80, second compressor 82 and second turbine 84), and also by the heat transfer components (including the common primary and secondary heat exchangers 86, 88, common reheater 90, and common condenser 92 and water collector 130) of the common heat transfer component means.

The common heat transfer component means must have adequate heat transfer capacity to satisfy conditioned air requirements of the specific load for which a particular embodiment of the integrated environmental control system 10 is designed. Therefore, when the integrated environmental control system 10 is operating in its redundant operating mode utilizing the supply air conditioning capabilities of only the mechanical components of the surviving shaft means, the supply air is still exposed to the total heat exchange capacity of the common heat transfer component means. Consequently, the integrated environmental control system 10 offers enhanced performance in the redundant operating mode compared to common non-integrated environmental control systems such as the Two Pack ECS 12 shown in FIG. 2. Additionally, because of that enhanced operating performance in the redundant operating mode, the integrated environmental control system 10 will be able to satisfy minimum conditioned air requirements of specific loads with mechanical components that have a smaller performance capacity than the mechanical components of known, non-integrated environmental control systems. The integrated environmental control system 10 also offers a redundant operating mode frequency (being defined for purposes herein as the frequency of failure requiring operating of an environmental control system in a redundant operating mode) that is at least as low as known non-integrated environmental control systems. That is because experience in the art with known environmental control systems demonstrates that failure is primarily associated with mechanical components (e.g., fans, compressors, and/or turbines) rather than heat transfer components, and the integrated environmental control system 10 includes the same potential redundancy in mechanical components as known non-integrated environmental control systems, while simplifying the heat transfer components and their related housings and feed/discharge lines.

It is stressed that, while the integrated environmental control system 10 of the present invention has been described with respect to a preferred and particular embodiment, the system 10 includes alternative embodiments. In particular, the shaft means described hereinabove may be modified for embodiments wherein no fan is secured to the shaft so that each shaft means includes only a compressor and turbine mechanically secured thereto, and the ram air duct does not include specific fan housings. Another structural modification for an alternative embodiment is that more than two shaft means are utilized with a single common heat transfer component means. It will be understood by those skilled in the art, that additional, obvious structural modifications can be made without departing from the spirit of the invention. Accordingly, reference should be made primarily to the accompanying claims rather than the foregoing specification to determine the scope of the invention.

We claim:

1. An integrated environmental control system for providing conditioned supply air to a load, which comprises:
   a. first shaft including means for mechanically compressing and cooling the supply air;
   b. second shaft including means for mechanically compressing and cooling the supply air;
   c. common heat transfer component means for cooling the supply air through heat exchange relationship with a cooling fluid;
   d. a supply fluid delivery means for delivering the supply air separately into the first shaft means and the second shaft means and for delivering the supply air in common through the common heat transfer component means to the load; and
   e. shut off valve means for selectively shutting off delivery of the supply air to either the first shaft means or the second shaft means whenever the shut off valve means detects an interruption in flow of conditioned supply air from either the first or second shaft means so that the supply air continues to be conditioned by the non-interrupted shaft means and by heat transfer components of the common heat transfer component means.

2. The integrated environmental control system of claim 1, wherein the first shaft means comprises a first shaft having a first fan, a first compressor and a first turbine mechanically secured to the first shaft, and the second shaft means comprises a second shaft having a second fan, a second compressor and a second turbine mechanically secured to the second shaft.

3. The integrated environmental control system of claim 2, wherein the common heat transfer component means comprises a common primary heat exchanger and a common secondary heat exchanger positioned within a duct directing the cooling fluid in a heat exchange relationship with the supply air passing through the common primary heat exchanger and common secondary heat exchanger.

4. The integrated environmental control system of claim 3, wherein the common heat transfer component means further comprises a common reheater positioned to pass compressed supply air in a heat exchange relationship with cooled supply air wherein the cooled supply air acts as a secondary cooling fluid, and a common condenser positioned to pass compressed supply air in a heat exchange relationship with decompressed, cooled supply air wherein the decompressed, cooled supply air acts as a tertiary cooling fluid.

5. The integrated environmental control system of claim 3, wherein the cooling fluid comprises ram air drawn from outside the integrated environmental control system through a ram air duct that houses the common primary heat exchanger, common secondary heat exchanger, the first fan and the second fan, wherein rotation of the fan assists movement of the ram air through the common primary and secondary heat exchangers.

6. An integrated environmental control system for providing conditioned supply air to a load, which comprises:
   a. a first shaft having a first fan, first compressor and first turbine mechanically secured to the first shaft for mechanically compressing and cooling the supply air;
   b. a second shaft having a second fan, second compressor and second turbine mechanically secured to the second shaft for mechanically compressing and cooling the supply air;
   c. common heat transfer component means for cooling the supply air through heat exchange relationship with a cooling fluid;
   d. a supply fluid delivery means for delivering the supply air in a first compressor line to the first compressor and in a separate second compressor line to the second compressor, and for delivering the supply air in a first turbine feed line to the first turbine and in a separate second turbine feed line to the second turbine, and for delivering the supply air in common delivery lines through the common heat transfer component means to the load;
   e. a first shut off valve secured to the first turbine feed line and a second shut off valve secured to the second turbine feed line for selectively shutting off delivery of the supply air to either the first turbine or the second turbine; and
   f. detecting means in electrical communication with the first and second shut off valves for selectively shutting off delivery of supply air to either the first turbine or second turbine to stop rotation of the first or second shaft whenever the detecting means detects an interruption in flow of conditioned supply air from either the first turbine or the second turbine so that the supply air continues to be mechanically compressed and cooled by the compressor and turbine on the rotating shaft and continues to be cooled by heat transfer components of the common heat transfer component means as the system operates in a redundant operating mode.

7. The integrated environmental control system of claim 6 wherein the detecting means comprises a first compressor temperature monitor in electrical communication with the first compressor and first shut off valve for monitoring the temperature of the supply air within the first compressor and shutting off the first shut off valve upon detection of an undesired supply air temperature within the first compressor, and a second compressor temperature monitor in electrical communication with the second compressor and second shut off valve for monitoring the temperature of the supply air within the second compressor and shutting off the second shut off valve upon detection of an undesired supply air temperature within the second compressor.

8. The integrated environmental control system of claim 7, wherein the common heat transfer component means comprises a common primary heat exchanger and a common secondary heat exchanger positioned within a duct directing the cooling fluid in a heat exchange relationship with the supply air passing through the common primary heat exchanger and common secondary heat exchanger.

9. The integrated environmental control system of claim 8, wherein the common heat transfer component means further comprises a common reheater positioned to pass compressed supply air in a heat exchange relationship with cooled supply air wherein the cooled supply air acts as a secondary cooling fluid, and a common condenser positioned to pass compressed supply air in a heat exchange relationship with decompressed, cooled supply air wherein the decompressed, cooled supply air acts as a tertiary cooling fluid.

10. The integrated environmental control system of claim 9, wherein the cooling fluid comprises ram air drawn from outside the integrated environmental control system through a ram air duct that houses the common primary heat exchanger, common secondary heat exchanger, and houses the first fan within a first fan housing and houses the second fan within a second fan housing so that rotation of the first fan and second fan pulls the ram air first through the common primary heat exchanger and common secondary heat exchanger and then through the first fan housing and second fan housing.

11. The integrated environmental control system of claim 10, wherein the first fan housing further comprises a first ram discharge check valve positioned downstream of the first fan and the second fan housing further comprises a second ram discharge check valve positioned downstream of the second fan.

12. The integrated environmental control system of claim 6, wherein the supply fluid delivery means includes a first compressor check valve secured to the first compressor line upstream of the first compressor that prevents reverse flow of any supply fluid through the first compressor whenever the first compressor is not operating while the system is operating in the redundant operating mode, and the supply fluid delivery means also includes a second compressor check valve secured to the second compressor line upstream of the second compressor that prevents reverse flow of any supply fluid through the second compressor whenever the second compressor is not operating while the system is operating in the redundant operating mode.

13. An integrated environmental control system for providing conditioned supply air to an aircraft cabin, which comprises:

a. a first shaft having a first fan, first compressor and first turbine mechanically secured to the first shaft for mechanically compressing and cooling the supply air;

b. a second shaft having a second fan, second compressor and second turbine mechanically secured to the second shaft for mechanically compressing and cooling the supply air;

c. a common primary heat exchanger and common secondary heat exchanger positioned within a ram air duct in heat exchange relationship with a ram air cooling fluid passing through the ram air duct;

d. a supply fluid line in fluid communication with the first compressor, first turbine, second compressor, second turbine, primary heat exchanger and secondary heat exchanger that delivers the supply air in a first compressor line to the first compressor and in a separate second compressor line to the second compressor, and delivers the supply air in a first turbine feed line to the first turbine and in a separate second turbine feed line to the second turbine, and that delivers the supply air in common delivery lines through the common primary heat exchanger and common secondary heat exchanger to the aircraft cabin;

e. a first shut off valve secured to the first turbine feed line and a second shut off valve secured to the second turbine feed line for selectively shutting off delivery of the supply air to either the first turbine or the second turbine; and f. detecting means in electrical communication with the first and second shut off valves for selectively shutting off delivery of supply air to either the first turbine or second turbine to stop rotation of the first or second shaft whenever the detecting means detects an interruption in flow of conditioned supply air from either the first turbine or the second turbine so that the supply air continues to be mechanically compressed and cooled by the compressor and turbine on the rotating shaft and continues to be cooled by the common primary heat exchanger and common secondary heat exchanger as the system operates in a redundant operating mode.

14. The integrated environmental control system of claim 13, wherein the detecting means comprises a first compressor temperature monitor in electrical communication with the first compressor and first shut off valve for monitoring the temperature of the supply air within the first compressor and shutting off the first shut off valve upon detection of an undesired supply air temperature within the first compressor, and a second compressor temperature monitor in electrical communication with the second compressor and second shut off valve for monitoring the temperature of the supply air within the second compressor and shutting off the second shut off valve upon detection of an undesired supply air temperature within the second compressor.

15. The integrated environmental control system of claim 14, wherein the supply fluid line includes a first compressor check valve secured to the first compressor line upstream of the first compressor that prevents reverse flow of any supply fluid through the first compressor whenever the first compressor is not operating while the system is operating in the redundant operating mode, and the supply fluid line also includes a second compressor check valve secured to the second compressor line upstream of the second compressor that prevents reverse flow of any supply fluid through the second compressor whenever the second compressor is not operating while the system is operating in the redundant operating mode.

16. The integrated environmental control system of claim 15 further comprising a common reheater positioned to pass compressed supply air in a heat exchange relationship with cooled supply air wherein the cooled supply air acts as a secondary cooling fluid, and a common condenser positioned to pass compressed supply air in a heat exchange relationship with decompressed, cooled supply air wherein the decompressed, cooled supply air acts as a tertiary cooling fluid.

17. The integrated environmental control system of claim 16, wherein the ram air duct includes a first fan housing that houses the first fan and includes a second fan housing that houses the second fan so that rotation of the first fan and second fan pulls the ram air cooling fluid first through the common primary heat exchanger and common secondary heat exchanger and then through the first fan housing and second fan housing.

18. The integrated environmental control system of claim 17, wherein the first fan housing further comprises a first ram discharge check valve positioned downstream of the first fan and the second fan housing further comprises a second ram discharge check valve positioned downstream of the second fan.

* * * * *